US010432569B2

(12) United States Patent
Horie et al.

(10) Patent No.: US 10,432,569 B2
(45) Date of Patent: Oct. 1, 2019

(54) PORTABLE ELECTRONIC DEVICE, INFORMATION PROCESSING METHOD, AND PROGRAM

(71) Applicant: Sony Computer Entertainment Inc., Tokyo (JP)

(72) Inventors: Kazuyoshi Horie, Tokyo (JP); Hideyuki Sasaki, Tokyo (JP); Shinichi Hirata, Kanagawa (JP); Nobuyuki Takahashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 247 days.

(21) Appl. No.: 14/958,100

(22) Filed: Dec. 3, 2015

(65) Prior Publication Data
US 2016/0182437 A1 Jun. 23, 2016

(30) Foreign Application Priority Data

Dec. 19, 2014 (JP) ................................. 2014-257718

(51) Int. Cl.
*G06F 15/16* (2006.01)
*H04L 12/58* (2006.01)
(Continued)

(52) U.S. Cl.
CPC .............. *H04L 51/32* (2013.01); *H04W 4/70* (2018.02); *H04W 68/00* (2013.01)

(58) Field of Classification Search
CPC ... H04L 51/32; H04L 43/045; H04L 43/0876; H04W 4/005; H04W 68/00; H04W 4/02
(Continued)

(56) References Cited

U.S. PATENT DOCUMENTS 9,210,566 B2 * 12/2015 Ziemianska ............ G06F 3/011
2010/0130128 A1 * 5/2010 Liao ....................... H04W 24/00
455/41.2
(Continued)

FOREIGN PATENT DOCUMENTS

JP 2005-033481 2/2005
JP 2007-317177 12/2007

OTHER PUBLICATIONS

Japanese Notification of Reasons for Refusal dated Jun. 28, 2016 from corresponding Application No. 2014-257715.
(Continued)

*Primary Examiner* — William G Trost, IV
*Assistant Examiner* — Tan Doan
(74) *Attorney, Agent, or Firm* — Katten Muchin Rosenman LLP

(57) ABSTRACT

A portable electronic device includes: a communication block configured to communicate with another portable electronic device different from said portable electronic device; an information acquisition block configured to acquire relation information that is information about a relation between a user of said portable electronic device and a user of said other portable electronic device from an external server through a network when said communication block communicates with said other electronic device; and a notification block configured to notify the user of said portable electronic device of the relation information acquired by said information acquisition block.

9 Claims, 7 Drawing Sheets

(51) Int. Cl.
*H04W 68/00* (2009.01)
*H04W 4/70* (2018.01)

(58) Field of Classification Search
USPC .......................................................... 709/206
See application file for complete search history.

(56) References Cited

U.S. PATENT DOCUMENTS

| | | | |
|---|---|---|---|
| 2010/0323668 A1* | 12/2010 | Matsui | H04M 1/72525 455/412.2 |
| 2011/0238755 A1* | 9/2011 | Khan | G06Q 50/01 709/204 |
| 2013/0013595 A1* | 1/2013 | Tseng | G06F 17/30867 707/723 |
| 2016/0034459 A1* | 2/2016 | Larsen | G06F 17/30044 707/740 |
| 2017/0164172 A1* | 6/2017 | Kodama | H04M 1/7253 |

OTHER PUBLICATIONS

Iori Kanno, "Communication Support System Which Covers the Whole Process Flow of Events, Collection of Papers on Multimedia, Distribution, Corporation and Mobile Symposium", (DICOM02013) Information Processing Society Symposium, Series vol. 2013, No. 2 [CD-ROM], IPSJ Symposium Series, Information Processing Society of Japan, Jul. 10, 2013, vol. 2013, pp. 56-63.

* cited by examiner

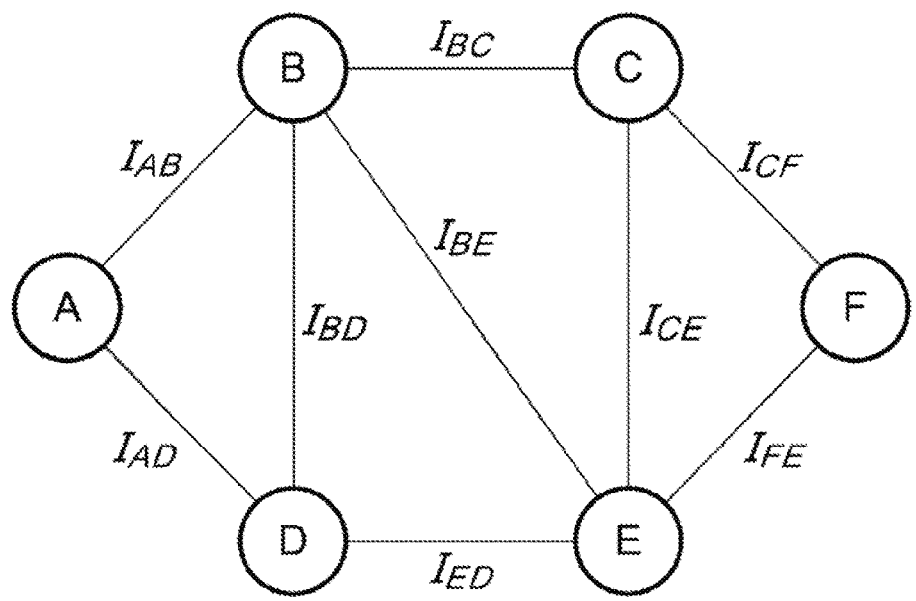

PORTABLE ELECTRONIC DEVICE, INFORMATION PROCESSING METHOD, AND PROGRAM

BACKGROUND

The present disclosure relates to a portable electronic device, an information processing method, and a program.

Recently, information communication networks and portable electronic devices have been quickly gaining popularity. Users of portable electronic devices are able to access remote servers anywhere anytime through information communication networks by use of the portable electronic devices and exchange information. One of the servers that can be accessed by these users is a social networking services (SNS) server. The SNS server is intended to build services for promoting social networking among users of the SNS server through information communication networks including the Internet.

If a user of an SNS server who has a portable electronic device meets other users of the SNS server, the user may know the relationship with these other users by operating the device.

SUMMARY

It is possible that, upon meeting another user, a user wants to know the relationship between them. Actually, however, operating the device by a user while meeting another user is often impolite to that another user.

The present disclosure has been made in view of these problems, and it is desirable to provide a technology for notifying a user of the relationship with other users whom the former user is meeting, without making the user to operate the device thereof.

In carrying out the disclosure and according to one mode thereof, there is provided a portable electronic device. The portable electronic device includes a communication block configured to communicate with another portable electronic device different from the portable electronic device; an information acquisition block configured to acquire relation information that is information about a relation between a user of the portable electronic device and a user of the other portable electronic device from an external server through a network when the communication block communicates with the other electronic device; and a notification block configured to notify the user of the portable electronic device of the relation information acquired by the information acquisition block.

In carrying out the disclosure and according to another mode thereof, there is provided an information processing method that is executed by a processor of a portable electronic device. The information processing method includes: communicating with another portable electronic device different from the portable electronic device; acquiring relation information that is information about a relation between a user of the portable electronic device and a user of the other portable electronic device from an external server through a network, upon communicating with the other electronic device; and notifying the user of the portable electronic device of the acquired relation information.

In carrying out the disclosure and according to another mode thereof, there is provided a program for having a portable electronic device realize information processing. The program includes: communicating with another portable electronic device different from the portable electronic device; acquiring relation information that is information about a relation between a user of the portable electronic device and a user of the other portable electronic device from an external server through a network, upon communicating with the other electronic device; and notifying the user of the portable electronic device of the acquired relation information.

As described above and according to the embodiment of the present disclosure, a technology for notifying a user of the relationship with another user whom the former user is meeting can be provided without making the user to operate the device.

BRIEF DESCRIPTION OF THE DRAWINGS

Other objects and modes of the disclosure will become apparent from the following description of embodiment with reference to the accompanying drawings in which:

FIG. 5 is a diagram schematically illustrating one example of a social graph;

FIG. 6 is a diagram schematically illustrating one example of a data structure of a database arranged in the SNS server mentioned above;

DETAILED DESCRIPTION OF THE PREFERRED EMBODIMENT

Figure 1:
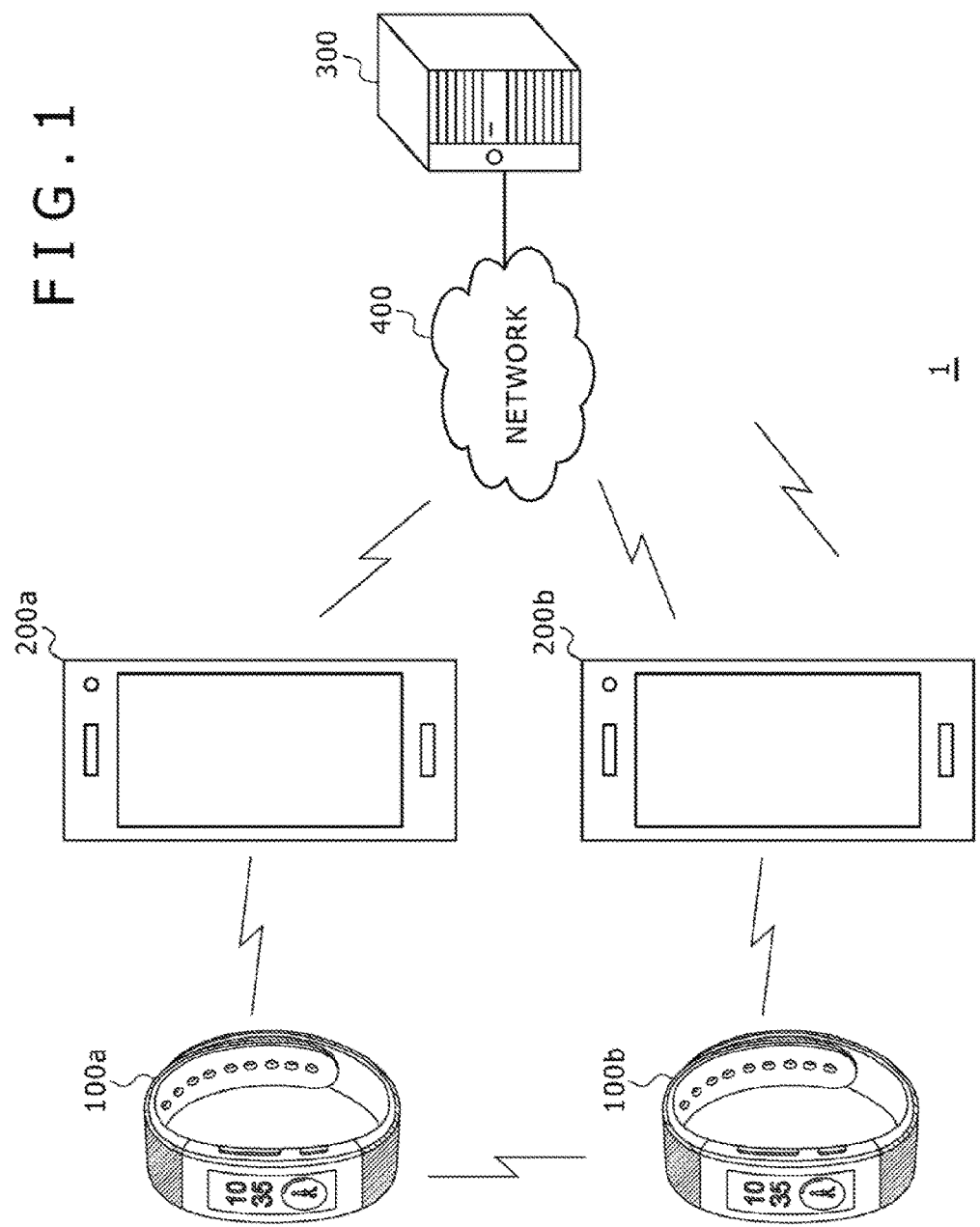
FIG. 1 is a schematic diagram illustrating an overall configuration of an information processing system practiced as an embodiment of the disclosure.

Now, referring to FIG. 1, there is schematically shown an information processing system 1 practiced as an embodiment of the disclosure. The information processing system 1 practiced as the embodiment has a first wearable terminal 100a, a second wearable terminal 100b, a first portable terminal 200a, a second portable terminal 200b, and an SNS server 300. In what follows, if there is no need for making distinction between the first wearable terminal 100a and the second wearable terminal 100b, these terminals will be generically referred to as "wearable terminal 100." Likewise, if there is no need for making distinction between the first portable terminal 200a and the second portable terminal 200b, these terminals will be generically referred to as "portable terminal 200." It should be noted that FIG. 1 shows an example in which the information processing system 1 has two wearable terminals 100 and two portable terminals 200. However, the number of wearable terminals 100 and portable terminals 200 is not limited to two; the information processing system 1 may have three or more of these terminals each.

The wearable terminal 100 shown in FIG. 1 is a wristwatch-type terminal. The wearable terminal 100 has a wear fixture such as a band with which to be worn on the body of a user for use. It should be noted that the wearable terminal 100 is not limited to a wristwatch-type terminal; for example, the wearable terminal 100 may be of another type such as spectacle, badge, ring, or necklace. In what follows, a terminal of wristwatch type is assumed. The wearable terminal 100 has a near-distance wireless communication module such as Bluetooth (registered trademark) or Wi-Fi (registered trademark) for example that allows communication with other wearable terminals 100 or portable terminals 200.

Especially, if a user uses the wearable terminal 100 and the portable terminal 200 in a set, the user is able to pair the wearable terminal 100 and the portable terminal 200 in advance. The pairing of the wearable terminal 100 and the portable terminal 200 can be realized by use of the pairing function of Bluetooth, for example.

The portable terminal 200 is an information processing apparatus that contains a battery and can be portably used by a user. Although not limited, the portable terminal 200 is a device such as a smartphone, a tablet terminal, or a phablet, for example. Like the wearable terminal 100, the portable terminal 200 has a near-distance wireless communication module and is capable of communication with the wearable terminal 100 and an access point (AP). The portable terminal 200 also has a mobile telephone communication module compatible with 3rd generation (3G), long term evolution (LTE) or the like. Therefore, the portable terminal 200 can communicate with the SNS server 300 via a network 400 such as the Internet.

As described above, the wearable terminal 100 is used as worn by a user. The portable terminal 200 is carried in a user's bag or user's cloth pocket for example. While the wearable terminal 100 is often carried as exposed to the outside, the portable terminal 200 is often carried in a cloth pocket or a bag, but these devices are common in that they are portable electronic devices. Therefore, in the present specification, it is supposed that "portable electronic device" include both the wearable terminal 100 used as worn on a user and the portable terminal 200 such as a smartphone.

The SNS server 300 is a server intended to provide social network services. In response to a request from the portable terminal 200 via the network 400, the SNS server 300 provides SNS information to the user of the portable terminal 200.

Figure 2:
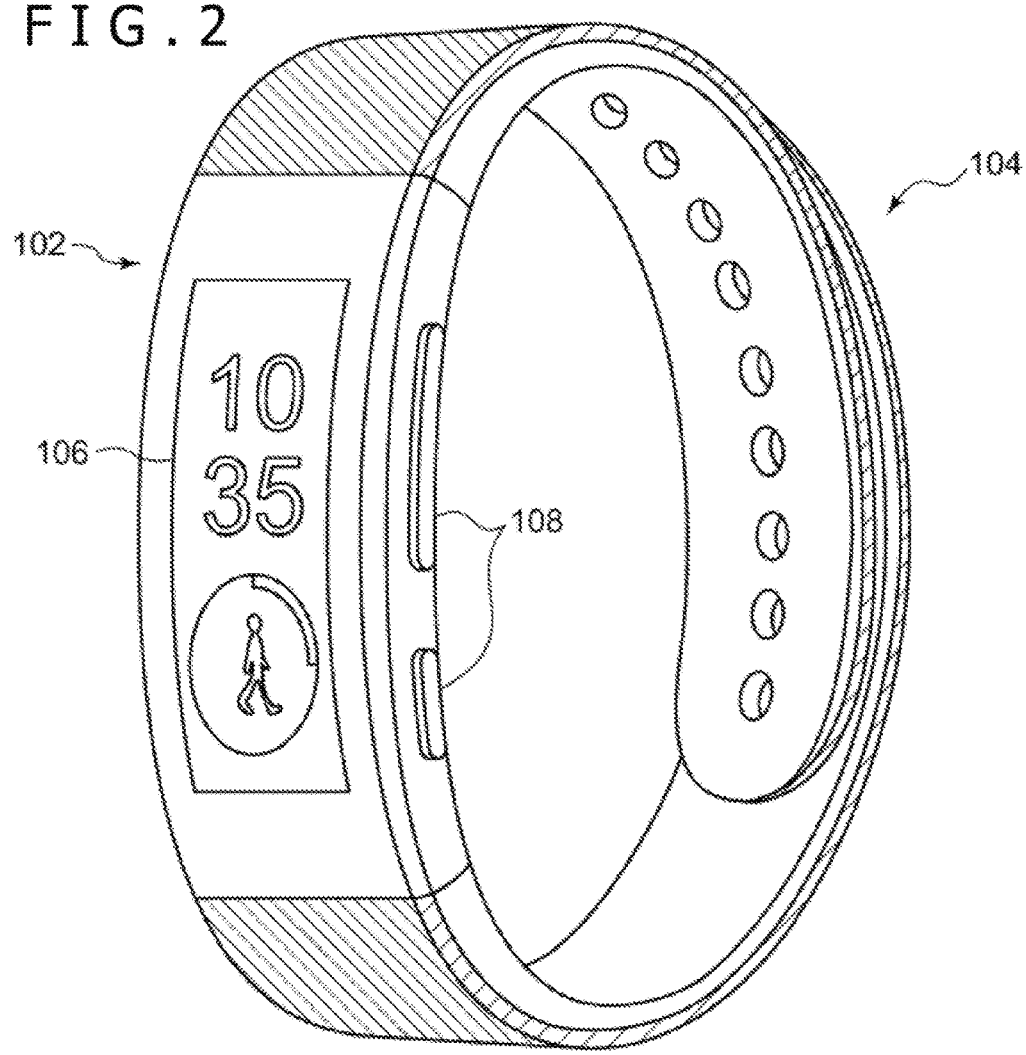
FIG. 2 is a perspective diagram illustrating an exemplary external view of a wearable terminal practiced as the embodiment.

Referring to FIG. 2, there is shown a diagram illustrating one example of an external view of the wearable terminal 100 practiced as the embodiment. The wearable terminal 100 has a main body section 102 and a wearing section 104. The main body section 102 has a display block 106 and an operation block 108. The main body section 102 is a housing for accommodating a communication module and a computation module such as a processor, all not shown. The display block 106, arranged on a surface of the main body section 102, displays such information to be transmitted to the user as computation module processing results and time. The operation block 108 is configured by mechanical buttons for example. The operation block 108 functions as a user interface for the user to enter instructions to the wearable terminal 100. Pressing the operation block 108 allows the user to enter instructions to the wearable terminal 100.

It should be noted that the operation block 108 is not limited to mechanical buttons. The operation block 108 may also be realized by making up the display block 106 with a touch panel for example and using graphical user interface (GUI) displayed by the display block 106, by audio input based on known voice recognition techniques, or using a mixture of the above-mentioned techniques.

Figure 3:
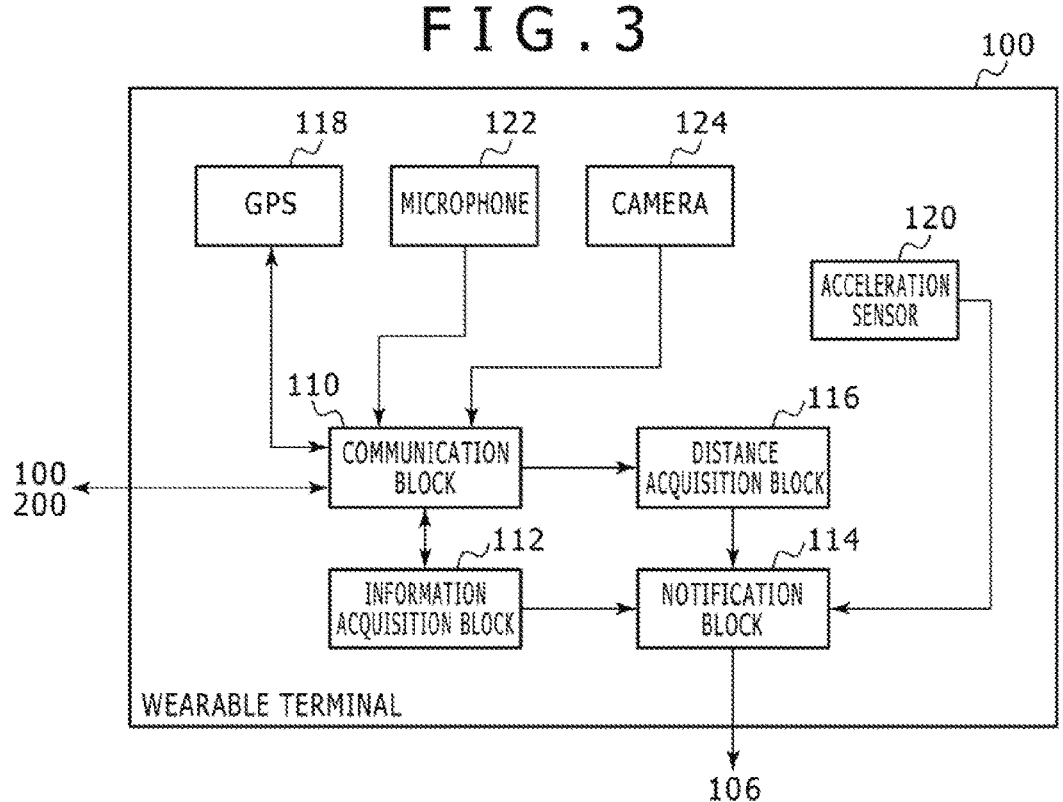
FIG. 3 is a block diagram schematically illustrating a functional configuration of the wearable terminal mentioned above.

Referring to FIG. 3, there is shown a diagram schematically illustrating a functional configuration of the wearable terminal 100 practiced as the embodiment. The wearable terminal 100 practiced as the embodiment has a communication block 110, an information acquisition block 112, a notification block 114, a distance acquisition block 116, a global positioning system (GPS) 118, an acceleration sensor 120, a microphone 122, and a camera 124.

FIG. 3 shows a functional configuration for realizing the wearable terminal 100 practiced as the embodiment and omits the other configurations. In FIG. 3, each of the elements described as functional blocks for executing a variety of processing operations can be made up with a central processing unit (CPU), a main memory, and other large scale integrations (LSIs) in hardware approach. In software approach, the realization is achieved by programs and so on loaded in the main memory. Therefore, it is understood by those skilled in the art that the above-mentioned functional blocks are realized only by hardware, by software, or by both, without restriction to any one approach.

The communication block 110 communicates with another wearable terminal 100 that is different from the wearable terminal 100 that is a portable electronic device. In FIG. 1 for example, the communication block 110 in the first wearable terminal 100a communicates with the communication block 110 in the second wearable terminal 100b. In what follows, description will be made on the premise that the first wearable terminal 100a in FIG. 1 communicates with the second wearable terminal 100b.

The communication block 110 has a Bluetooth communication module (not shown) for example. The communication block 110 transmits a Bluetooth inquiry message and communicates with the second wearable terminal 100b that is another wearable terminal 100 that replied to this inquiry message.

When the communication block 110 communicates with the second wearable terminal 100b, the information acquisition block 112 gets related information that is information about the relation between the user of the first wearable terminal 100a and the user of the second wearable terminal 100b. To be more specific, the information acquisition block 112 accesses the SNS server 300 that is an external server via the communication block 110 and the network 400 so as to get relation information from the SNS server 300. It should be noted that details of the relation information will be described later.

In what follows, the user of the first wearable terminal 100a is sometimes referred to as "first user" and the user of the second wearable terminal 100b as "second user."

The notification block 114 notifies the first user who is the user of the first wearable terminal 100a of the relation information obtained by the information acquisition block 112. Here, the notification block 114 may display the acquired relation information onto the display block 106 in at least one manner of text and graphics, thereby executing the notification of the relation information. Alternatively, the notification block 114 may execute the notification of the relation information through a speaker (not shown) or a vibrator (not shown). Alternatively, the notification block 114 may notify the first user of the acquisition of the relation information by way of light emission of a light emitting diode (LED) (not shown).

Here, the communication block 110 of the second wearable terminal 100b also notifies the second user of the relation information, upon starting of communication with the first wearable terminal 100a. It is assumed here that the notification block 114 of the first wearable terminal 100a and the notification block 114 of the second wearable terminal 100b notify the first user of the acquisition of the relation information through light emission of LEDs, for example. At this moment, the notification block 114 of the second wearable terminal 100b may flash the LED of the second wearable terminal 100b in the same flash pattern of the LED through which the notification block 114 of the first wearable terminal 100a executes the notification. Alternatively, the notification block 114 of the second wearable terminal 100b may flash the LED of the second wearable terminal 100b in the same light emission color as the color of the LED through which the notification block 114 of the first wearable terminal 100a executes the notification.

As described above, the wearable terminal 100 is worn by the user and therefore exposed to the outside. Therefore, the first user and the second user can make confirmation of the light emission of not only the own wearable terminal 100 but also the light emission of the wearable terminal 100 worn by another user. Consequently, each user can find the wearable terminal 100 that is executing notification of the same notification pattern as that of own wearable terminal 100 so as to check the notification the relation information related with a particular person. For example, in a party room in which many people are getting together, the user can get a clue to find another user to which the relation information is to be transmitted.

The distance acquisition block 116 acquires a distance between the first wearable terminal 100a and the second wearable terminal 100b. The distance acquisition block 116 can realize the ranging between the first wearable terminal 100a and the second wearable terminal 100b by use of the electromagnetic wave strength of an electromagnetic wave received by a Bluetooth communication module arranged in the communication block 110, for example. To be more specific, the distance measurement can be realized by a known technique for converting a received signal strength indication (RSSI) value into a distance between the two wearable terminals 100.

As descried above, the relation information is information about the relation between the first user and the second user. Therefore, if the first user and the second user are remotely positioned, making them unrecognizable each other, for example, transmitting the relation information to the wearable terminal 100 of each other will not always immediately useful. Therefore, when the distance acquired by the distance acquisition block 116 has reached a predetermined notification distance or less, the notification block 114 may transmit the relation information. Here, "predetermined notification distance" denotes a distance that provides a notification determination threshold that is reference when the notification block 114 determines whether or not to notify the user of the relation information acquired by the information acquisition block 112, for example.

A specific value of "notification determination threshold" may be experimentally provided by considering usage conditions and the like of the wearable terminal 100; five meters for example. If the first user and the second user are located within five meters, it is highly probable to recognize each other upon notification of the relation information by the notification blocks 114. In addition, a notification determination threshold may be variable by user's operating the operation block 108 or the like.

The wearable terminal 100 is small in size because of the wearability by the user and there is limitations to the size of the display area of the display block 106. Therefore, it is difficult for the display block 106 to display many pieces of relation information at one time. Therefore, the notification block 114 stops the notification of the relation information upon passing of a predetermined period of time after the notification of the relation information. "Predetermined period of time" denotes "notification continuation time" that is referenced when the notification block 114 stops the notification of the relation information. Once the notification continuation time has passed after the notification of the relation information, the notification block 114 deletes that relation information and executes the notification of the next relation information. Consequently, many pieces of relation information can be displayed in a time sequence manner on the display block 106 having a limited display area.

A specific value of "notification continuation time" may be determined by experimentally considering use conditions of the wearable terminal 100; 20 seconds for example. In addition, a notification continuation time value may be variable by user's operating the operation block 108 or the like.

The acceleration sensor 120 detects the motion of the user wearing the wearable terminal 100. Frequency analysis of a signal detected by the acceleration sensor 120 allows the presumption of user's motion states, such as "run," "walk," and "stop." For example, assumed that a signal that is detected by the acceleration sensor 120 when the user is walking be 2 Hz. Then, if the user runs, the frequency of a signal that is detected by the acceleration sensor 120 gets higher than that of walking. At the same time, the spectrum strength of the signal increases. When the user stops or sits, the frequency of a signal that is detected by the acceleration sensor 120 is thought to be almost zero.

As described above, a user motion detected by the acceleration sensor 120 includes a user moving speed and a user acceleration. For example, suppose that if the first user is moving at a high speed as in a car, the first user pass by the second user walking along a sidewalk. In this case, it is thought that the probability in the interaction between the first user and the second user is low even if the distance between the first user and the second user is less than the notification distance.

Therefore, the notification block 114 may execute the notification of the relation information if the user moving speed detected by the acceleration sensor 120 is less than a predetermined speed; if the user moving speed exceeds a predetermined speed, the notification block 114 may not execute the notification of the relation information. Here, "predetermined speed" is a threshold of notification determination speed that is referenced when the notification block 114 determines whether or not to execute notification of the relation information, for example. Consequently, the first user and the second user can suppress the notification of the information that is low in the necessity of reference. A specific value of "notification determination speed" may be experimentally determined by considering use conditions of the wearable terminal 100; 10 kilometers/hour for example. In addition, a notification determination speed value may be variable by user's operating the operation block 108 or the like.

If a user moving speed detected by the acceleration sensor 120 exceeds a predetermined speed, then results of frequency analysis (results of the moving speed of a user subject to detection or the presumption of running, for example) may be notified.

The GPS 118 acquires a current position of the wearable terminal 100 when the communication block 110 communicates with another wearable terminal 100. The current position of the wearable terminal 100 acquired by the GPS 118 is transmitted to the SNS server 300 via the communication block 110 and the portable terminal 200.

The microphone 122 acquires the audio around the wearable terminal 100 when the communication block 110 communicates with another wearable terminal 100. The audio acquired by the microphone 122 is transmitted to the SNS server 300 via the communication block 110 and the portable terminal 200. Likewise, the camera 124 acquires the video around the wearable terminal 100 when the communication block 110 communicates with another wearable terminal 100. The video acquired by the camera 124 is transmitted to the SNS server 300 via the communication block 110 and the portable terminal 200.

As described above, when the first wearable terminal 100a and the second wearable terminal 100b reach a communicable range, the GPS 118, the microphone 122, and the camera 124 start sensing, transmitting acquired information to the SNS server 300. Consequently, the SNS server 300 can acquire interaction information between the first user and the second user including the information about the time, place, and the contents of the interaction between these users or the information indicative that the users have merely passed by each other.

The information acquisition block 112 may acquire, from the SNS server 300, interaction information related with the interaction executed in the past between the first user and the second user. Further, the notification block 114 may transmit interaction information in addition to relation information. Consequently, each user can know the experience shared between the users in the past, thereby getting a clue for starting interaction.

Although not illustrated, the wearable terminal 100 may additionally have a vital sensor module, a human body communication module, or a near field communication (NFC) module. A vital sensor module monitors the heart rate, temperature, perspiration, and other physiological phenomena of the user having the wearable terminal 100, for example. The heart rate of a user having the wearable terminal 100 may goes up when the user gets in the proximity of a person to whom the user takes fancy or a person whom the user does not like, for example. Alternatively, a user may relax when the user talks with particular persons. The information acquired by the vital sensor module is useful for enhancing the accuracy of the history of the contact with persons who the user has met.

Human body communication is one of near-distance wireless communication schemes for transmitting information through the electric field around human body and a human body communication module for human body communication is being put into practical use. Arranging a human body communication module on the wearable terminal 100 allows the detection of the contact by handshake for example between the users having wearable terminals 100. Consequently, the accuracy of the history of the contact with persons whom the user has met can be enhanced.

NFC is one of known near-distance wireless communication technologies. Arranging an NFC module on the wearable terminal 100 of wristwatch type for example allows the NFC module to be communicable when the users having these wearable terminals 100 shake hands, putting their NFC modules in the proximity each other. Consequently, the accuracy of the history of the contact with persons whom the user has met can be enhanced.

Figure 4:
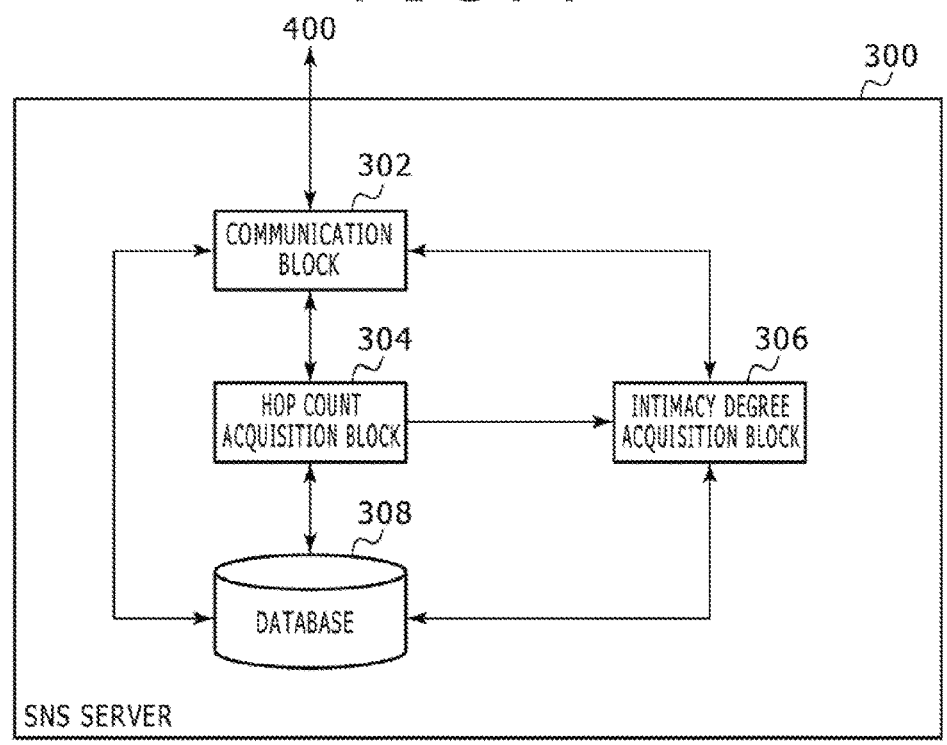
FIG. 4 is a block diagram schematically illustrating a functional configuration of an SNS server practiced as the embodiment.

Referring to FIG. 4, there is shown a diagram schematically illustrating a functional configuration of the SNS server 300 practiced as the embodiment. The SNS server 300 practiced as the embodiment has a communication block 302, a hop count acquisition block 304, an intimacy degree acquisition block 306, and a database 308.

FIG. 4 shows a functional configuration for realizing the SNS server 300 practiced as the embodiment and omits the other configurations. In FIG. 4, each of the elements described as functional blocks for executing a variety of processing operations can be made up with a CPU, a main memory, and other LSIs in hardware approach. In software approach, the realization is achieved by programs and so on loaded in the main memory. Therefore, it is understood by those skilled in the art that the above-mentioned functional blocks are realized only by hardware, by software, or by both, without restriction to any one approach.

The communication block 302 communicates with the portable terminal 200 via the network 400. Because the portable terminal 200 communicates with the wearable terminal 100, the communication block 302 can communicate with the wearable terminal 100 consequently.

The database 308 stores the data of a user of a social network service provided by the SNS server 300. The database 308 also stores the positional information, audio information, and video information transmitted from the wearable terminal 100 via the network 400 as interaction information by relating these pieces of information with user of the wearable terminal 100 and with acquisition dates.

The SNS server 300 is a server that the user of a social network service provided by the SNS server 300 is allowed to access. Therefore, the first user and the second user mentioned above are users of a social network service provided by the SNS server 300.

In a social network service, a social graph is used to show the connection between a person and other persons. When a user meets other users, knowledge about how one user is connected to other users in the social graph allows to provide an index for knowing the relation with other users.

"Hop count" is known for one piece of information indicative of the distance between one user and another in the social graph. The following describes the hop count with reference to FIG. 5.

Referring to FIG. 5, there is schematically shown one example of a social graph. In FIG. 5, alphabets A, B, C, D, E, and F are indicative of users of a social network service provided by the SNS server 300. The line interconnecting different two users is indicative that these two users are in "friend relation."

"Hop count" is information indicative of how many "friend relations" mentioned above are there at minimum from one user to another user on the social graph. For example, in FIG. 5, there is a friend relation between user A and user B, so that hop count is 1.

For another example, consider a hop count between user A and user C in FIG. 5. In the social graph shown in FIG. 5, there are two or more routes from user A to user C, such as A-B-C, A-B-E-C, A-B-D-E-C, A-B-E-F-C, and so on. The shortest among these routes is route A-B-C. In the shortest route from user A to user C, two friend relations between user A and user B and between user B and user C. Therefore, the hop count between user A and user C is 2.

The relation information mentioned above may include hop count. Hop count is information indicative of the distance between the first user and the second user who is different from the first user in the social graph specifying human relations. Therefore, if hop count is indicated as relation information, the first user and the second user can find common points in the mutual friend relation of common friends, thereby getting a clue for starting interaction.

Therefore, upon request from the information acquisition block 112 in the first wearable terminal 100a, the hop count acquisition block 304 acquires the hop count between the first user and the second user. The hop count acquisition block 304 transmits the acquired hop count to the first wearable terminal 100a via the network 400. Consequently, the first user who is the user of the first wearable terminal 100a can know the distance with the second user in the social graph.

Referring to FIG. 6, there is schematically shown one example of a data structure of the database 308 arranged in the SNS server 300 practiced as the embodiment. Each of the users of a social network service provided by the SNS server 300 is assigned a user identification (ID) for uniquely identifying the user. In the example shown in FIG. 6, the information about the user having user ID of ID00001 is illustrated. The information related with user ID and stored in the database 308 includes terminal ID, user personal information, and interaction information.

Terminal ID is an identifier for identifying the wearable terminal 100 owned by a user identified by a user ID. In acquiring information from the SNS server 300, the information acquisition block 112 in the wearable terminal 100 transmits the terminal ID of the wearable terminal 100 and the terminal ID of a terminal with which communication has started to the SNS server 300. Referencing the database 308, the hop count acquisition block 304 can get the user ID of user owning each terminal ID acquired from the wearable terminal 100. Consequently, the hop count acquisition block 304 can compute a hop count.

The personal information of each user includes various items of information related with that user. For example, user personal information may include any of user's current address, name, age, gender, educational background, career experience, hobbies, favorite books, mottos, favorite movies, favorite foods, frequently used applications, favorite restaurants, and so on and is not limited thereto.

Interaction information includes user IDs of users whom the user concerned has encountered in the past. Interaction information further includes the information about encounter places, encounter dates and times, the length of time in which the user was in the proximity of other users, the information about talks (audio) picked up through the microphone 122, and the video information acquired through the camera 124, these items of information being related with the user IDs of other users whom the user concerned encountered.

It should be noted here that the hop count mentioned above is the calculation merely based on determination whether or not there is a friend relation between users. Therefore, the calculation based on the hop count does not reflect the information such as whether different two users are close friends, just acquaintances, or remote friends who met each other only one in the past. For example, in FIG. 5, the hop number between user A and user C was calculated as 2 on the basis of the shortest route from user A to user C being route A-B-C. However, if user B and user C are remote friends, the probability of user A to meet user C via user B may be low.

On the other hand, if user B and user E are close friends and user E and user C are also close friends, then user A may meet user C through the introduction of user B and user E. In this case, in the social graph shown in FIG. 5, the route from user A to user C is shorter along route A-B-E-C than route A-B-C.

Whether or not two different users are frequently interacting can be estimated on the basis of the interaction information mentioned above. A concept "personal space" is known as an index indicative how close given two users are with each other. This is understood that the emotional intimacy between human beings is expressed as a physical distance.

With "personal space," it is defined that close distances (0 cm to 45 cm) are taken if given two users are in a relation where they can easily physically touch such as family members or loves. Likewise, it is defined that individual distances (45 cm to 120 cm) are taken when personal talks are done with friends and so on, social distances (1.2 m to 3.6 m) are taken when colleagues work together, and public distances (3.6 m or more) are taken when publicly facing public persons.

In addition, if given two users are intimate, the period of time in which the two users are together is thought to be longer than otherwise. Taking this into consideration, the intimacy degree acquisition block 306 in the SNS server 300 computes the degree of intimacy obtained by adjusting the hop count between the first user and the second user on the basis of the interactive relation between the persons existing between the first user and the second users. The degree of intimacy between the first user and the second user is defined as the reciprocal of the total sum of "degrees of alienation" between the persons existing between the first user and the second user.

Before description of the computation of degrees of intimacy, "degree of alienation" that is the opposite concept of the degree of intimacy will be described below. "Degree of alienation" is defined that, as given two users get more intimate with each other, the degree of alienation gets smaller; as given two users get less intimate, the degree of alienation gets greater. If given two users get together in a longer time, the intimacy degree acquisition block 306 decreases the degree of alienation between the two users as compared with when the two users get together in a shorter time. On the contrary, if given two users get together in a shorter distance, the intimacy degree acquisition block 306 decreases the degree of alienation between the two users as compared with when the two users get together in a longer distance.

In the social graph shown in FIG. 5, $I_{AB}$ is indicative of the degree of alienation between user A and user B. Likewise, $I_{BC}$ is indicative of the degree of alienation between user B and user C. The same holds true with others.

The following describes the computation of "degree of intimacy" between user A and user C by use of "degree of alienation" between user A and user C in FIG. 5. The intimacy degree acquisition block 306 acquires a route from user A to user C from the hop count acquisition block 304. Next, the intimacy degree acquisition block 306 computes the degree of individual alienation of each friend relation existing in each route. Lastly, the intimacy degree acquisition block 306 computes a total sum of individual degrees of alienation computed in all routes. The maximum value of the reciprocals of the total sum of the degrees of alienation is indicative of the degree of intimacy between user A and user C.

For example, in the example shown in FIG. 5, it is assumed that user D and user E be close friends and user E and user C love each other. It is also assumed that user B and user C be alienated from each other. Then, in this case, the degree of alienation between user D and user E and the degree of alienation between user E and user C are smaller than the degree of alienation between user B and user C. It is assumed that the value of total sum of the degree of alienation in the route from user A to user C $S1=I_{AD}+I_{DE}+I_{CE}$ be smaller than the value of $S2=I_{AD}+I_{BC}$ and the minimum; namely, 1/S1 be greater than 1/S2. At this time, the degree of intimacy between user A and user C is $1/(I_{AD}+I_{DE}+I_{CE})$.

The computation based on hop count of route A-B-C is smaller than route A-D-E-C. On the other hand, in the computation based on the degree of intimacy, the shortest route from user A to user C is route A-D-E-C. Because user D and user E and user E and user C are intimate, it is highly possible that user A may meet user C via user D and user E. Thus, in the computation of the distance between two different users in a social graph, the degree of intimacy is effectively higher in accuracy than hop count.

To this point, the functional configurations of the wearable terminal 100 and the SNS server 300 in the information processing system 1 practiced as the embodiment have mainly be described. The following describes usage scenes of the information processing system 1 practiced as the embodiment.

Figure 7:
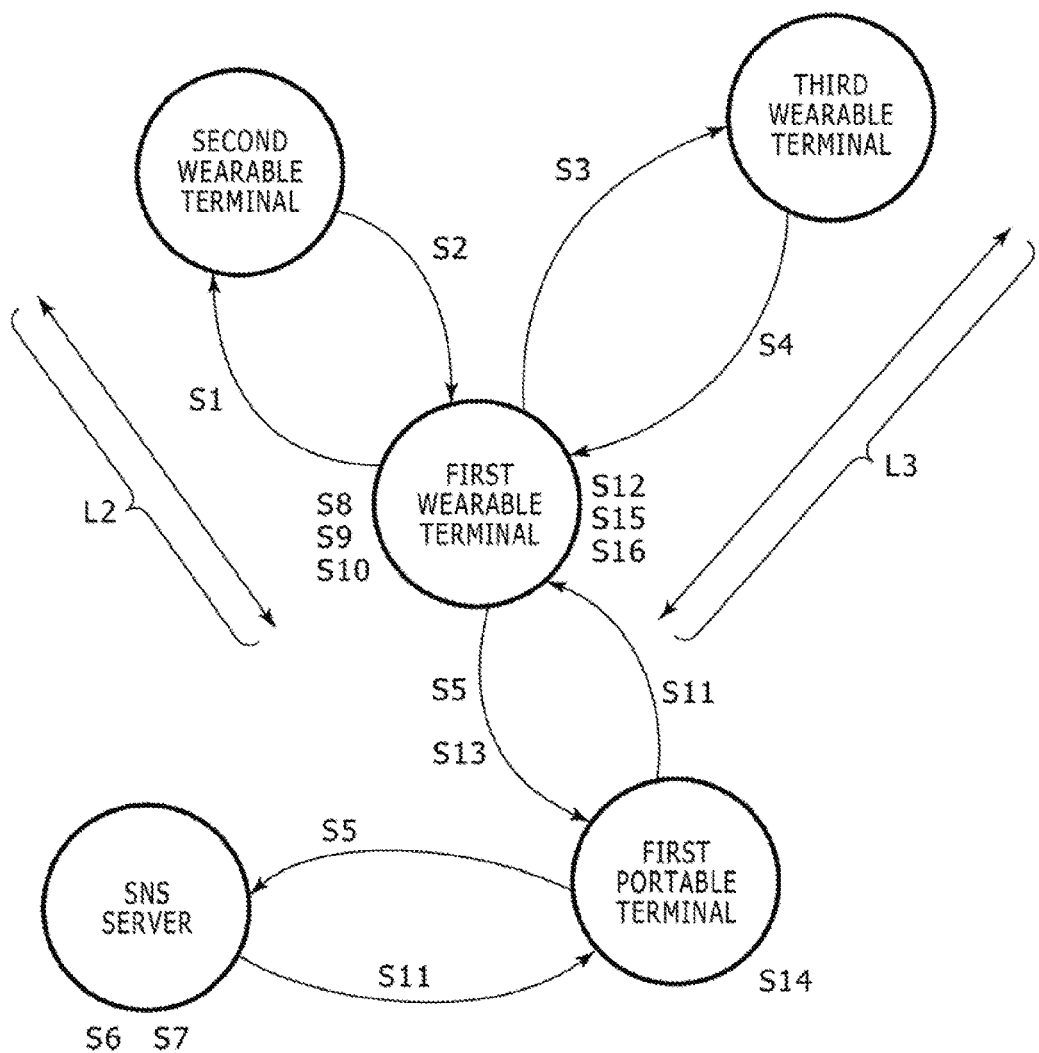
FIG. 7 is a diagram illustrating flows of information processing that is executed by the information processing system mentioned above.

Referring to FIG. 7, there is shown a diagram illustrating flows of information processing to be executed by the information processing system 1 practiced as the embodiment. FIG. 7 shows an example in which each of the first user, the second user, and a third user has the wearable terminal 100. In FIG. 7, it is assumed that the second wearable terminal 100b owned by the second user and a third wearable terminal 100c owned by the third user be located in the communication range of the first wearable terminal 100a owned by the first user.

The first wearable terminal 100a owned by the first user transmits a Bluetooth inquiry to the second wearable terminal 100b owned by the second user (S1). The first wearable terminal 100a receives a reply from the second wearable terminal 100b along with the terminal ID of the second wearable terminal 100b (S2). Likewise, the first wearable terminal 100a transmits a Bluetooth inquiry to the third wearable terminal 100c (S3). The first wearable terminal 100a receives a reply from the third wearable terminal 100c along with the terminal ID of the third wearable terminal 100c (S4).

The first wearable terminal 100a transmits the terminal IDs acquired from the second wearable terminal 100b and the third wearable terminal 100c to the SNS server 300 via the first portable terminal 200a and the network 400 along with a request for relation information (S5). Referencing the social graph in the database 308 on the basis of the terminal ID of the second wearable terminal 100b acquired from the first wearable terminal 100a, the SNS server 300 computes a hop count and the degree of intimacy between the first user and the second user as relation information (S6). Likewise, referencing the social graph in the database 308 on the basis of the terminal ID of the third wearable terminal 100c acquired from the first wearable terminal 100a, the SNS server 300 computes a hop count and the degree of intimacy between the first user and the third user as relation information (S7).

The distance acquisition block 116 of the first wearable terminal 100a acquires distance L2 between the first wearable terminal 100a and the second wearable terminal 100b (S8). The distance acquisition block 116 of the first wearable terminal 100a also acquires distance L3 between the first wearable terminal 100a and the third wearable terminal 100c (S9).

The information acquisition block 112 of the first wearable terminal 100a compares distance L2 and distance L3 acquired by the distance acquisition block 116 of the first wearable terminal 100a with the distance providing the above-mentioned notification determination threshold (S10). If at least one of distance L2 and distance L3 is found less than the distance providing the notification determination threshold, then the information acquisition block 112 of the first wearable terminal 100a acquires relation information from the SNS server 300 via the first portable terminal 200a and the network 400 (S11). The notification block 114 of the first wearable terminal 100a notifies the first user of the relation information acquired by the information acquisition block 112 (S12). The notification block 114 of the first wearable terminal 100a instructs the first portable terminal 200a to display the relation information acquired from the SNS server 300 (S13). The first portable terminal 200a displays the acquired relation information (S14). It should be noted that the first wearable terminal 100a and the first portable terminal 200a are assumed to be paired with each other in advance.

Figure 8A:
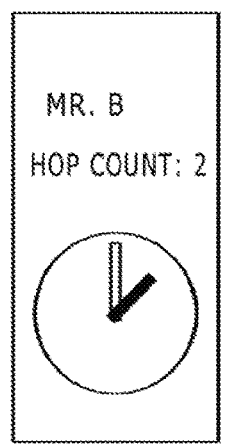
FIGS. 8A and 8B are diagrams illustrating one example of related-information notification screen.
Figure 8B:
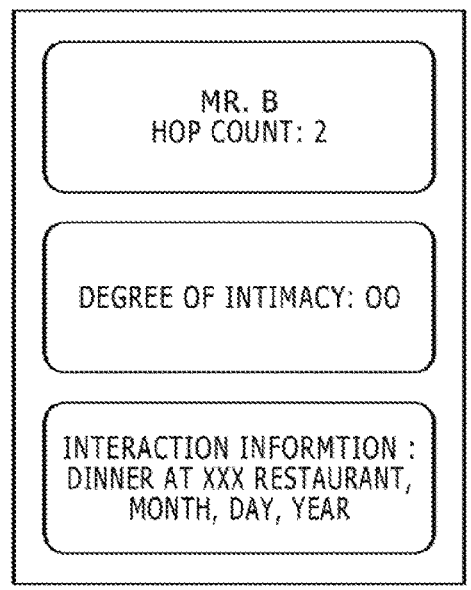

FIGS. 8A and 8B are diagrams illustrating examples of notification screens of relation information. To be more specific, FIG. 8A shows one example of a notification screen to be displayed on the display block 106 of the wearable terminal 100.

FIG. 8A shows an example in which the notification block 114 of the wearable terminal 100 displays the relation information about the second user onto the display block 106. As shown in FIG. 8A, the display block 106 of the wearable terminal 100 shows "Mr. B" that is the name of the second user and a hop count between the first user and the second user.

FIG. 8B shows one example of a notification screen to be displays on the display screen of the portable terminal 200. Generally, the display area of the portable terminal 200 is wider than the display area of the wearable terminal 100. Consequently, more items of information are displayed on the display area of the portable terminal 200 than the relation information that is shown on the display block 106 of the wearable terminal 100. In the example shown in FIG. 8B, degree of intimacy and interaction information are displayed in addition to "Mr. B" that is the name of the second user and the hop count between the first user and the second user on the display area of the portable terminal 200.

Returning to the description of FIG. 7, if distance L2 and distance L3 are both less than the distance providing the notification determination threshold, then the notification block 114 of the first wearable terminal 100a executes notification of the relation information about the user who is higher in the degree of intimacy with the first user. If the degree of intimacy between the first user and the second user is equal to the degree of intimacy between the first user and the third user, then the notification block 114 of the first wearable terminal 100a executes notification of the relation information about the user who is smaller in the hop count with the first user. If the hop counts are also equal to each other, then the notification block 114 of the first wearable terminal 100a executes notification of the relation information about the user who the first user has met most recently.

As described above, if there are two or more wearable terminals 100 that the communication block 110 commutates with, the notification block 114 changes the sequence of notifications on the basis of hop count and degree of intimacy. Consequently, the first user who is the user of the first wearable terminal 100a can browse, with priority, the information about the users higher in relationship with the first user.

If distance L2 or distance L3 exceeds a distance providing the notification determination threshold, the notification block 114 of the first wearable terminal 100a stops the notification of relation information (S15). Even if distance L2 or distance L3 remains within a distance providing the notification determination threshold, the notification block 114 of the first wearable terminal 100a also stops the notification of relation information if a predetermined notification continuation time passes from the notification relation information (S16).

As described above, according to the information processing system practiced as the embodiment, the relationship with encountering persons can be notified of without user's operating a device.

While preferred embodiment of the present disclosure have been described using specific terms, such description is for illustrative purpose only, and it is to be understood that changes and variations may be made without departing from the spirit or scope of the following claims.

(Example of First Variation)

So far, the wearable terminal 100 as a wristwatch-type terminal has been described. As described above, the wearable terminal 100 need not be of a wristwatch type; the wearable terminal 100 may be of spectacle type for example.

Figure 9:
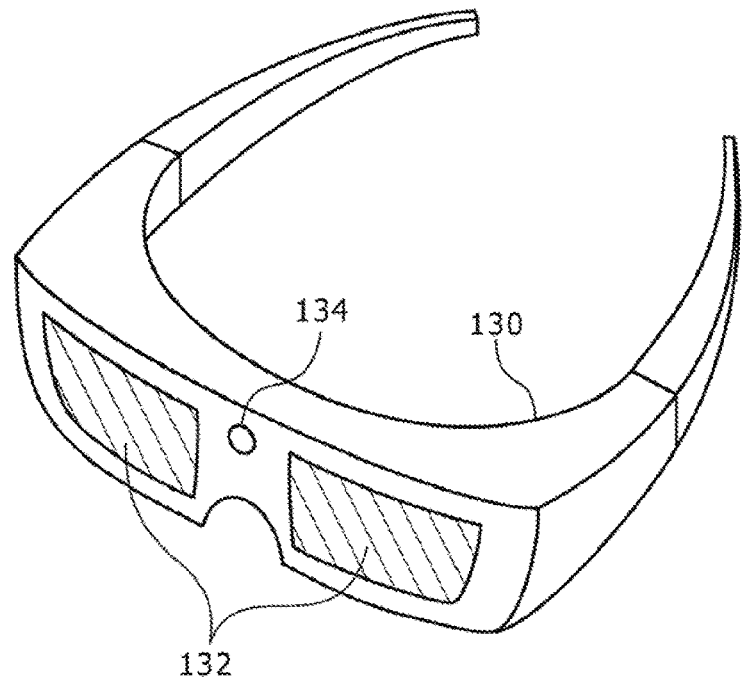
FIG. 9 is a perspective diagram schematically illustrating an external view of a spectacle-type terminal related with a first variation.

Referring to FIG. 9, there is shown a diagram schematically illustrating an external view of a spectacle-type terminal 101 practiced as first variation of the present disclosure. The spectacle-type terminal 101 practiced as the first variation has a housing 130 for accommodating various modules, a presentation block 132 for presenting three-dimensional vision, and a camera 134. Although not shown, the spectacle-type terminal 101 also has an earphone for outputting audio.

The presentation block 132 includes an optically transmissive head-mounted display (HMD) that present three-dimensional vision to user's eyes. Hence, scenes outside the spectacle-type terminal 101 can be observed and, at the same time, the video that is presented by the optically transmissive HMD can be observed.

The camera 134 takes an image of a subject located inside an area including user visual field having the spectacle-type terminal 101 on. Hence, the camera 134 is arranged at the user's middle forehead when the user puts on the spectacle-type terminal 101. The camera 134 can be realized by a known solid-state imaging sensor such as charge coupled device (CCD) image sensor or a complementary metal oxide semiconductor (CMOS) image sensor, for example.

The housing 130 serves as a frame in the spectacle-type terminal 101 having the shape of spectacles and, at the same time, accommodates various modules (not shown) for use by the spectacle-type terminal 101. The modules by the spectacle-type terminal 101 include an optical engine including hologram light-guiding plate for realizing the optically transmissive HMD, communication modules including a Wi-Fi module and Bluetooth module, an electronic compass, an acceleration sensor, a tilt sensor, a GPS sensor, an illumination sensor, a vital sensor module, a human body communication module, and an NFC module. These modules are illustrative only and therefore the spectacle-type terminal 101 need not have all of these modules. Selective installation of these modules depends on estimated usage scenes of the spectacle-type terminal 101.

Referring to FIG. 9, there is shown a diagram illustrating the spectacle-type terminal 101. For the shapes of the spectacle-type terminal 101, there are possibly other variations, such as shapes of a hat, a belt fixed around user's head, and a helmet fully covering user's head. It would be easily understood by those skilled in the art that the spectacle-type terminal 101 of any shape is included in the embodiment of the present disclosure. It should be noted that the functional configuration of the spectacle-type terminal 101 is substantially the same as the wristwatch-type wearable terminal 100 practiced as the embodiment except that the presentation block 132 includes an optically transmissive HMD.

Figure 10:
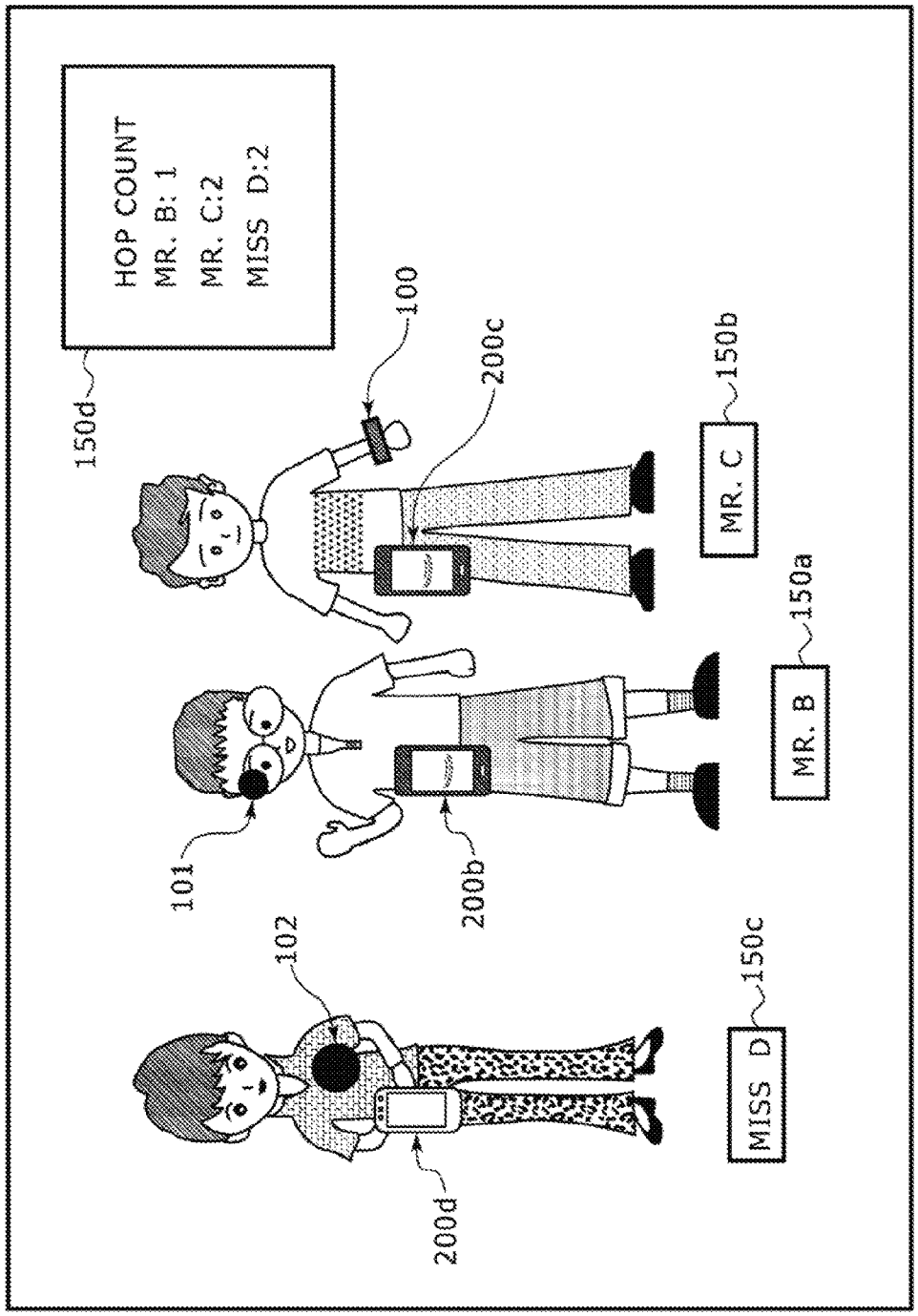
FIG. 10 is a diagram illustrating one example of a notification screen of the spectacle-type terminal related with the first variation.

Referring to FIG. 10, there is shown a diagram illustrating one example of a notification screen of the spectacle-type terminal 101 practiced as the first variation, the diagram being indicative of a video in which the first user having the spectacle-type terminal 101 on makes observation through the presentation block 132. FIG. 10 shows a visual field of the first user at the time when the first user having the spectacle-type terminal 101 on is meeting Mr. B the second user, Mr. C the third user, and Miss D the fourth user.

As shown in FIG. 10, the second user owns the spectacle-type terminal 101 and the second portable terminal 200b. The third user owns wristwatch-type wearable terminal 100 and a third portable terminal 200c. The fourth user owns a badge-type wearable terminal 103 and a fourth portable terminal 200d.

In FIG. 10, a first popup 150a, a second popup 150b, a third popup 150c, and a fourth popup 150d which are generically referred to as a popup 150 are information that is presented by the presentation block 132 of the spectacle-type terminal 101 worn by the first user. Because the presentation block 132 is a transmissive HMD, the presentation block 132 can present the popup 150 as superimposed with the external scene of the visual field of the first user. Consequently, the first user can make confirmation of the relation information presented by the presentation block 132 without operating a device and without averting gaze.

(Example of Second Variation)

So far, the description has been made that the information processing system 1 includes the wearable terminal 100 and the portable terminal 200. It should be noted however that the wearable terminal 100 may not be necessarily an indispensable configuration. It is also practicable that the portable terminal 200 integrates the function of the wearable terminal 100 into the portable terminal 200 to operate only by itself. Assume that the portable terminal 200 have the GPS 118, the microphone 122, the camera 124, and the acceleration sensor 120, for example. In this case, the functions of the communication block 110, the information acquisition block 112, the notification block 114, and the distance acquisition block 116 can be realized by executing, by the processor of the portable terminal 200, programs for realizing these functions.

Alternatively, the wearable terminal 100 need not incorporate all of the functions shown in FIG. 3; for example, the portable terminal 200 may execute at least a part of the functions of the wearable terminal 100. This can be realized by using the functions of the wearable terminal 100 from the wearable terminal 100 by pairing the portable terminal 200 with the wearable terminal 100 by use of Bluetooth technology.

Consequently, if the wearable terminal 100 does not have the GPS 118, the microphone 122, and the camera 124, for example, but, if the portable terminal 200 has these functions, the wearable terminal 100 can use these functions. Further, integrating the distance measurement results of the Bluetooth communication modules of the wearable terminal 100 and the portable terminal 200 widens the detection range and enhances detection accuracy. This is because three-point distance measurement can be realized in combination with the Bluetooth communication module of a mate's portable electronic device. This also simplifies the configuration of the wearable terminal 100, leading to the cost cut of the wearable terminal 100 and power dissipation saving. In addition, this is also advantageous in increasing the operation time of the wearable terminal 100. The above-mentioned effects can easily be realized because not only the user owns the portable terminal 200 but also the user has the wearable terminal 100 on.

(Example of Third Variation)

In the above description, if the distance between the wearable terminals 100 has become less than the distance providing a notification determination threshold, each wearable terminal 100 displays the relation information. However, depending on the usage scenes, it may be disadvantageous that own relation information is transmitted to other users.

Therefore, the wearable terminal 100 practiced as the third variation of the present disclosure has "stealth mode." In the stealth mode, if a Bluetooth inquiry comes from another wearable terminal 100, the terminal ID of own terminal is not transmitted at the time of reply. Consequently, the user wearing the wearable terminal 100 set to the stealth mode can suppress the notification of own relation information to any user wearing another wearable terminal 100.

The user can set or clear the stealth mode on the wearable terminal 100 by operating the operation block 108 as desired. Alternatively, the user can set the positional information about particular areas or stores to the wearable terminal 100 in advance in order for the wearable terminal 100 to automatically get in the stealth mode when the wearable terminal 100 gets in these areas or stores. The automatic setting can be realized by use of the positional information provided from the GPS 118. In this case, when the wearable terminal 100 leaves a position in the stealth mode, the stealth mode of the wearable terminal 100 can also be automatically cleared. Whether to set or not to set the stealth mode is realized that a stealth setting block not shown of the wearable terminal 100 in cooperation with the GPS 118.

(Example of Fourth Variation)

In the above description, the wearable terminal 100 communicates with the SNS server 300 via the portable terminal 200. Alternatively, the wearable terminal 100 may communicate with the SNS server 300 not via the portable terminal 200. This is realized by building a mobile telephone communication module (not shown) such as a 3G module into the wearable terminal 100, for example.

(Example of Fifth Variation)

In the above description, the distance acquisition block 116 executes distance measurement by use of the strength of the electromagnetic wave received by a Bluetooth communication module. Alternatively, or in addition to the technique, the distance acquisition block 116 may execute distance measurement by use of sonic wave. The distance measurement based on sonic wave is advantageous for the wearable terminal 100 because, as compared with a terminal device such as a smartphone for example, the wearable terminal 100 is frequently exposed to the external environment.

(Example of Sixth Variation)

In the examples mentioned above, the notification block 114 notifies the user of the relation information including hop count and the degree of intimacy and interaction information. In addition, the notification block 114 may notify the user of the social graph itself acquired from the SNS server 300.

(Example of Seventh Variation)

In the above description, the intimacy degree acquisition block 306 acquires the degree of intimacy between two different users. In addition, the intimacy degree acquisition block 306 may acquire the degree of intimacy between a user and a non-human object. For example, the degree of intimacy between a user and a television receiver installed at home is the user may be acquired. The degree of intimacy between a user and a television receiver thereof may be computed on the basis of a time or a time zone when the user is located in front of the television, for example. At this time, programs of interest of a user may be estimated by recording and analyzing the audio of the television.

The intimacy acquisition block 306 may compute not only the degree of intimacy between a television as hardware and a user, but also the degree of intimacy between a television program as software and a user. This may be realized by use of the accumulated viewing time of a particular television program as the computation of the degree of intimacy, for example.

The present disclosure contains subject matter related to that disclosed in Japanese Priority Patent Application JP 2014-257718 filed in the Japan Patent Office on Dec. 19, 2014, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing method that is executed by a processor of a portable electronic device, the method comprising:
   communicating with another portable electronic device different from the portable electronic device,
   wherein the portable electronic device comprises a GPS receiver, a Bluetooth module, a microphone, an acceleration sensor, and a digital camera;
   acquiring relation information that is information about a relation between a user of the portable electronic device and a user of the another portable electronic device from an external server through a network, upon communicating with the other portable electronic device;
   acquiring, from the external server, interaction information that is information about interactions done in the past between the user of the portable electronic device and the user of the another portable electronic device;
   notifying the user of the portable electronic device of the acquired relation information and the interaction information using a relation notification on a display of the portable electronic device,
   wherein the relation notification appears in a same color as a relation notification shown on the another portable electronic device, and
   wherein the relation notification is not displayed if a speed of the user is greater than a predetermined speed as determined by the acceleration sensor;

during a social interaction between the user of the portable electronic device and the user of the another portable electronic device, collecting social interaction information,
wherein the social interaction information includes a distance between the portable electronic device and the another portable electronic device during the social interaction,
wherein the social interaction information further includes GPS data collected from the GPS receiver, audio collected by the microphone, and video acquired by the digital camera;
transmitting the social interaction information to the external server;
determining a type of the social interaction using the social interaction information; and
classifying the user of the another portable electronic device using the distance between the portable electronic device and the another portable electronic device during the social interaction.

2. A portable electronic device comprising:
a processor;
a Global Positioning System (GPS) receiver;
a microphone;
a digital camera;
a display;
a Bluetooth module configured to acquire a distance between the portable electronic device and another portable electronic device,
a communication block configured to communicate, using the processor, with the another portable electronic device different from the portable electronic device;
an information acquisition block configured to acquire relation information that is information about a relation between a user of the portable electronic device and a user of the another portable electronic device from an external server through a network when the communication block communicates with the another electronic device; and
a notification block configured to notify the user of the portable electronic device of the relation information acquired by the information acquisition block using a relation notification on the display,
wherein the relation notification is not displayed if a speed of the user is greater than a predetermined speed as determined by an acceleration sensor,
wherein the information acquisition block further acquires, from the external server, interaction information that is information about interactions done in the past between the user of the portable electronic device and the user of the another portable electronic device,
wherein the notification block executes notification of the interaction information in addition to the relation information using the display,
wherein, after completion of a social interaction between the user of the portable electronic device and the user of the another portable electronic device, the notification block transmits social interaction information to the external server,
wherein the social interaction information includes a distance between the portable electronic device and the another portable electronic device during the social interaction,
wherein the social interaction information further includes GPS data collected from the GPS receiver, audio collected by the microphone, and video acquired by the digital camera,
wherein the external server utilizes the social interaction information to determine a type of the social interaction,
wherein the distance between the portable electronic device and the another portable electronic device during the social interaction is used to classify the user of the another portable electronic device, and
wherein the notification block executes the relation notification with a same LED flashing pattern as a LED flashing pattern which a notification block of the other portable electronic device with which the communication block communicates.

3. The portable electronic device according to claim 2, wherein the notification block stops the relation notification when a predetermined period of time has passed from the notification of the relation information.

4. The portable electronic device according to claim 2, wherein the relation information is information indicative of a distance between the user of the portable electronic device and the user of the another portable electronic device in a social graph specifying human relations.

5. The portable electronic device according to claim 2, wherein the relation information is a hop count between the user of the portable electronic device and the user of the another portable electronic device in a social graph specifying human relation.

6. The portable electronic device according to claim 5, where the relation information is a degree of intimacy computed by adjusting a hop count between the user of the portable electronic device and the user of the another electronic device in the social graph specifying human relations on a basis of interaction relations between persons existing between the user of the portable electronic device and the user of the another portable electronic device.

7. The portable electronic device according to claim 6, wherein, if there are plurality of other portable electronic devices with which the communication block communicates, the notification block changes a sequence of notification on a basis of one of the hop count and the degree of intimacy.

8. The portable electronic device according to claim 2, wherein the portable electronic device is wearable on a wrist of the user.

9. A non-transitory computer readable medium having stored thereon a program for having a portable electronic device, the program comprising:
a communication block configured to communicate, using a processor, with another portable electronic device different from the portable electronic device;
an information acquisition block configured to acquire relation information that is information about a relation between a user of the portable electronic device and a user of the another portable electronic device from an external server through a network when the communication block communicates with the another electronic device; and
a notification block configured to notify the user of the portable electronic device of the relation information acquired by the information acquisition block using a relation notification on a display of the portable electronic device,
wherein the relation notification appears in a same color as a relation notification shown on the another portable electronic device, wherein the relation notification is not displayed if a speed of the user is greater than a predetermined speed as determined by the acceleration sensor, wherein the information acquisition block further acquires, from the external server, interaction information that is information about interactions done in the past between the user of the portable electronic device and the user of the another portable electronic device, and wherein the notification block executes notification of the interaction information in addition to the relation information using the display, wherein, after completion of a social interaction between the user of the portable electronic device and the user of the another portable electronic device, the notification block transmits social interaction information to the external server, wherein the portable electronic device comprises a GPS receiver, a Bluetooth module, a microphone, and a digital camera, wherein the Bluetooth module configured to acquire a distance between the portable electronic device and another portable electronic device, wherein the social interaction information includes GPS data collected from the GPS receiver, audio collected by the microphone, and video acquired by the digital camera, wherein the social interaction information further includes a distance between the portable electronic device and the another portable electronic device during the social interaction, wherein the external server utilizes the social interaction information to determine a type of the social interaction, wherein the distance between the portable electronic device and the another portable electronic device during the social interaction is used to classify the user of the another portable electronic device.

* * * * *